United States Patent
Brands

[11] 3,888,108
[45] June 10, 1975

[54] PAVEMENT TESTING APPARATUS

[76] Inventor: Frank W. Brands, Rte. 2, Box 429, Pullman, Wash. 99163

[22] Filed: Aug. 2, 1973

[21] Appl. No.: 385,181

[52] U.S. Cl.................................. 73/12; 73/146
[51] Int. Cl..................... G01n 29/00; G01n 3/00
[58] Field of Search .......... 73/12, 67, 67.1, 67.2, 73/67.6, 146; 181/.5 NP

[56] References Cited
UNITED STATES PATENTS
2,549,076  4/1951  Gallagher et al. ................ 73/67
3,762,496  9/1971  Milberger et al. ............ 181/.5 NP FOREIGN PATENTS OR APPLICATIONS
211,133  10/1968  U.S.S.R. ........................... 73/67.6
200,364  10/1958  Austria ............................ 73/67.2

Primary Examiner—James J. Gilu
Attorney, Agent, or Firm—Wells, St. John & Roberts

[57] ABSTRACT

A testing apparatus for detecting transmission of an energy impulse through pavement as an indicator of its structural condition. The entire unit is self-contained within a portable container that rests on the pavement surface. Impact is provided by means of a hammer that falls vertically when manually released. A pair of spaced transducers operating as accelerometers in contact with the pavement produce electrical signals related to the magnitude of the energy impulse transmitted through the pavement to them. These signals are monitored, rectified, integrated and used with readout circuitry to calculate a useful numerical value indicative of pavement structural condition.

4 Claims, 6 Drawing Figures

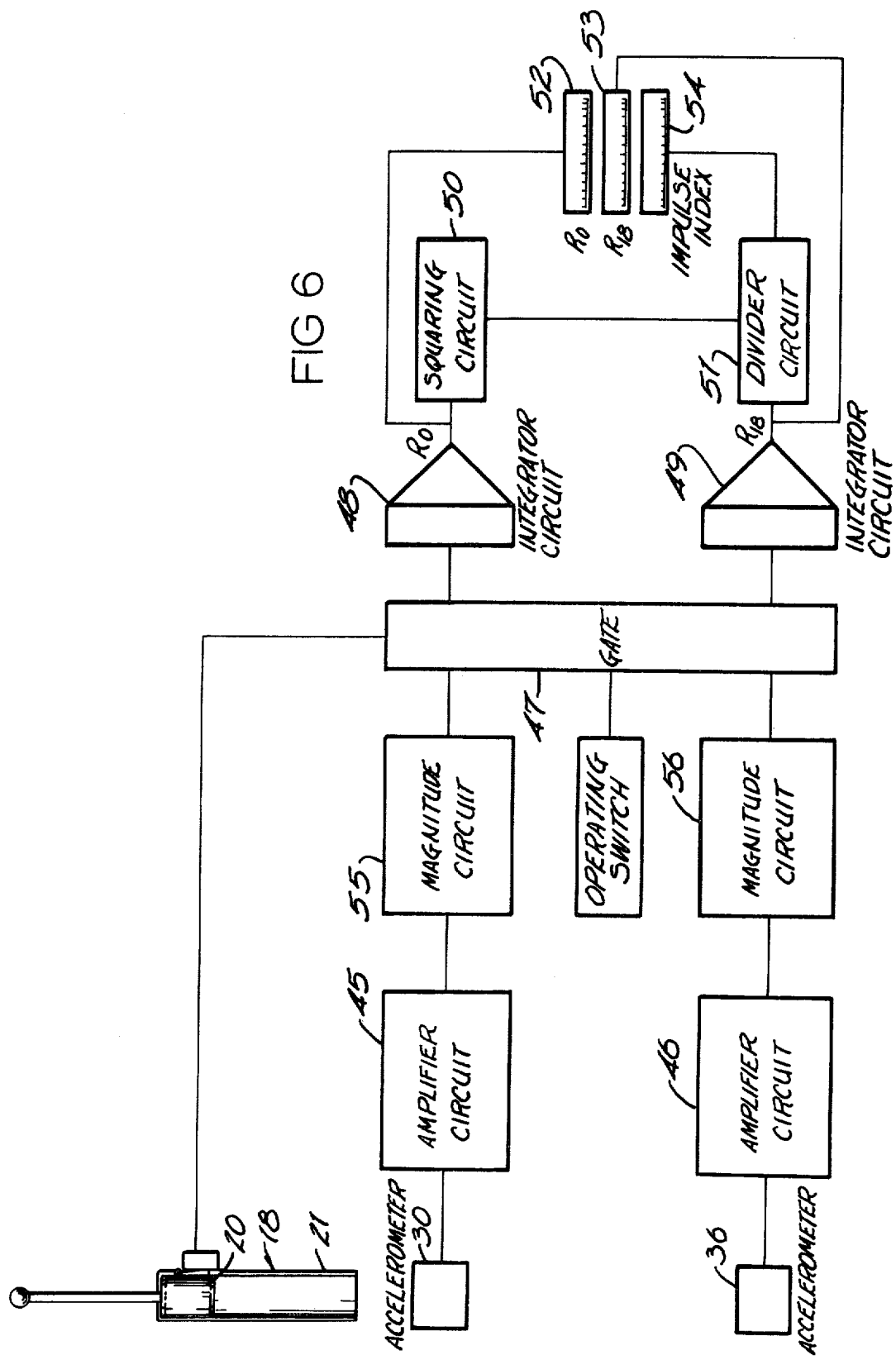

PAVEMENT TESTING APPARATUS

BACKGROUND OF THE INVENTION

The present invention relates to the development of a portable, hand-carried testing device for pavement structural condition. It is designed to supplement or replace existing operating equipment for pavement evaluation. Current devices for this purpose can be categorized in the following groups according to the parameters evaluated: (1) roughness or texture; (2) profile or slope; (3) static or nearly static deflections under load; (4) vibration under dynamic loads; or (5) visual evaluation.

Of the above tests, those relating to static deflections or monitoring of vibration under dynamic load are intended to provide indications of pavement strength. However, static testing does not always accurately represent the high speed dynamic loads to which highway pavements are subjected. The dynamic vibration tests are subject to resonance and anti-resonance phenomena. Existing equipment for such test purposes is bulky, expensive and relatively slow in operation. Visual evaluation methods require careful training and selection of personnel, and at best depend on subjective judgement. While rating systems based on existing tests have demonstrated usefulness, the desirability of automatic and meaningful objective measurement of pavement strength is clearly indicated.

Several prior systems of pavement evaluation have utilized the analysis of steady state single frequency vibration response. However, advantages can be gained by using a wideband analysis of vibrational response to a shock wave or an impulse, as described herein. Signal theory demonstrates that an impulse contains all frequencies, and therefore if an impulse is used to excite the pavement, more information is obtainable from the vibrational response than is obtainable if a steady state single frequency of excitation is employed. An added advantage of using an impulse to excite the pavement is that the time required to perform the measurement is greatly reduced over that inherently required for steady state sinusoidal excitation.

To apply impulse testing to pavement requires that the surface of the pavement be impacted with a hammer blow of controlled energy. Appropriate transducers, such as accelerometers, are positioned at controlled distances from the point of impact. The resulting transducer output signals are used to calculate a value or quantity referred to herein as the "Impulse Index."

Prior testing has verified that the dissipation of energy as the signal propagates through the pavement is an important pavement parameter. This is expected because the sonic propagation characteristics of a medium are a function of the shear, tensile and elastic properties of the medium. The coupling of material particles in the medium is directly related to the propagation and attenuation of the impulse energy. A weak section of pavement, having poor qualities of shear and tensile strength and elasticity is analagous to a layer of poorly consolidated material. If one point on such a layer is struck, the lack of coupling to adjacent points precludes the propagation of energy and the signal attenuates rapidly with distance. Tests undertaken to verify this theoretical behavior on actual roads have shown that the values discussed below correlate well with pavement conditions.

To facilitate use of impulse testing on pavement, the present apparatus has been developed to provide a portable, hand-carried unit which is entirely self-contained and easily operable to achieve reproducible results. All components of the apparatus are housed within a single container. The container can be placed on any section or portion of pavement to be tested, without setting up or adjusting any of the physical devices which must contact the pavement. The impact hammer is readily operated to provide identical impact during each test, and operation of the hammer automatically triggers a gate circuit to minimize interference by background "noise" from sources such as passing vehicles.

SUMMARY OF THE INVENTION

The apparatus essentially comprises a supporting container or frame containing an impact hammer, together with first and second spaced electrical transducers, one being immediately adjacent to the hammer and the second being spaced outwardly from the first. Electrical monitoring circuits receive the resulting signals from the transducers, and are controlled through a gate circuit interrelated with operation of the hammer.

One object of this invention is to provide a self-contained, hand-carriable, suitcase-sized unit which will conveniently permit the acquisition of objective strength data for highway or pavement testing.

Another object of this invention is to provide a convenient manual apparatus for highway structural condition testing which is portable and readily adaptable to all highway configurations.

Another object of this invention is to provide such an apparatus that is simple in operation and which readily provides reproducible results for direct comparison purposes.

Another object of the invention is to provide a built-in mechanism to eliminate deviations in value which might otherwise result from background "noise" along a highway section.

These and further objects will be obvious from the following disclosure, taken together with the accompanying drawings. The drawings illustrate a preferred physical embodiment of the apparatus.

DESCRIPTION OF THE DRAWINGS

FIG. 6 is a schematic block diagram of the basic circuitry included in the testing unit.

DESCRIPTION OF A PREFERRED EMBODIMENT

Figure 1:
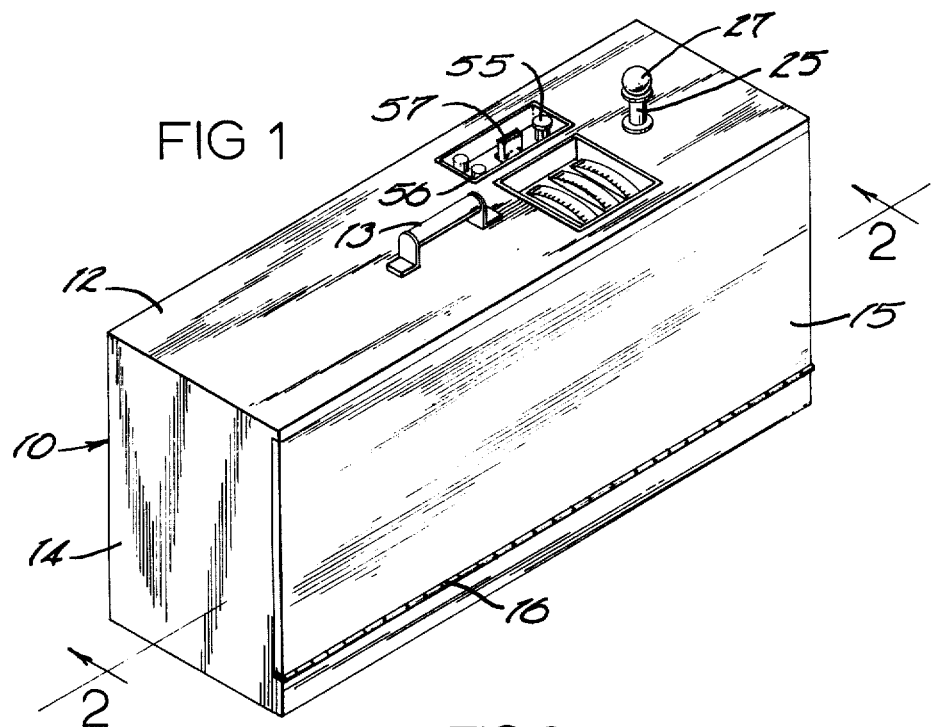
FIG. 1 is a perspective view of the enclosed unit.
Figure 2:
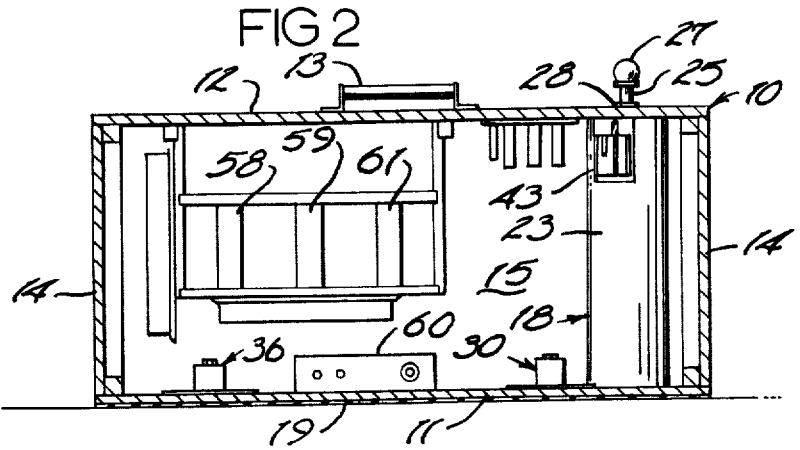
FIG. 2 is a cross-sectional elevation view taken along line 2—2 in FIG. 1.
Figure 3:
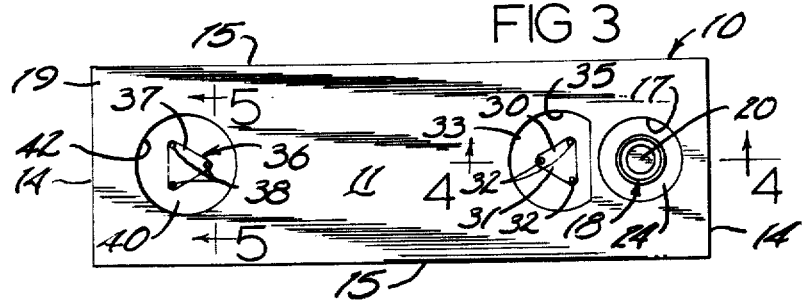
FIG. 3 is a bottom view of the apparatus shown in FIGS. 1 and 2.

The general details of the unit are visible in FIGS. 1–3. It is housed within a container 10 including a bottom wall 11, a spaced parallel top wall 12, and upright end walls 14 and side walls 15. The top wall 12 has a central handle 13 for manual carrying purposes. One side wall 15 is hinged at 16 along its lower edge to provide access to the interior of container 10. The container 10 can be made of any suitable materials. Bottom wall 11 is either constructed of frictional material or provided with a resilient non-skid pad 19 to prevent movement of container 10 when resting on the upper surface of a pavement portion to be tested.

Figure 4:
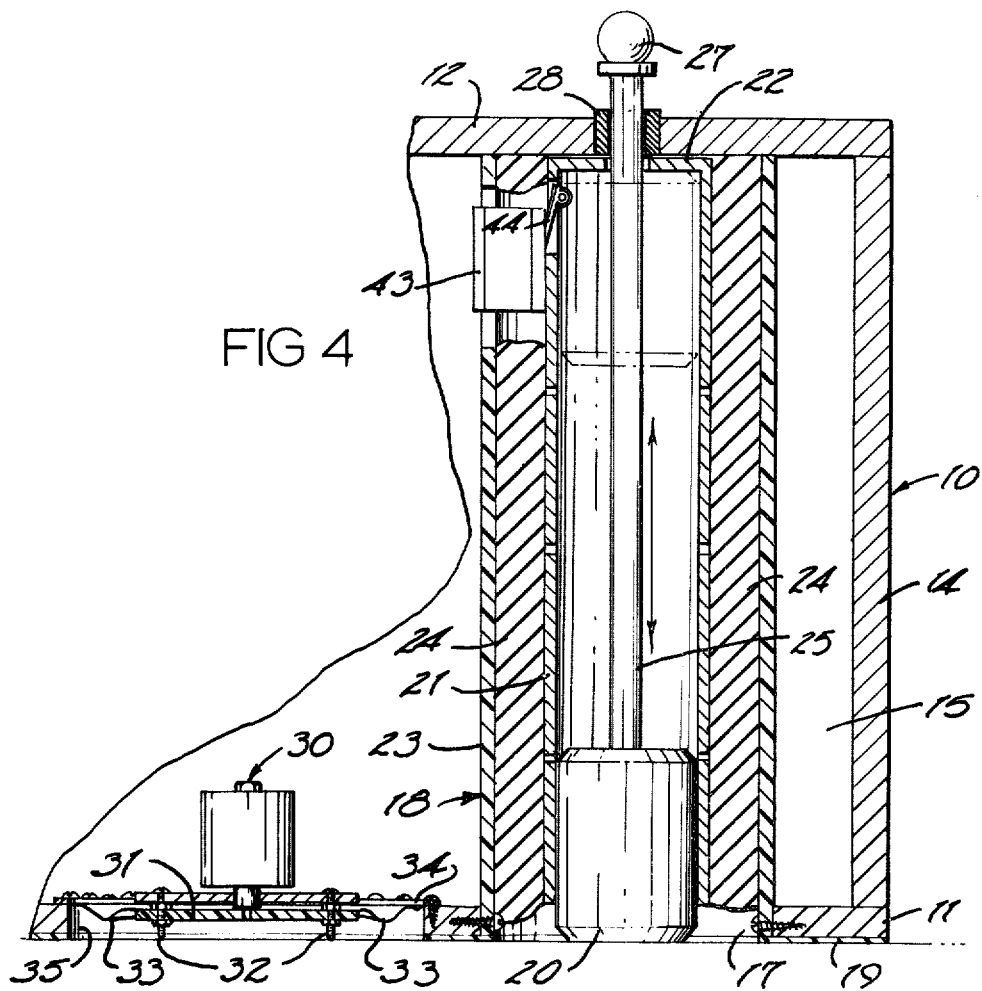
FIG. 4 is an enlarged fragmentary cross-sectional view taken along line 4—4 in FIG. 3.
Figure 5:
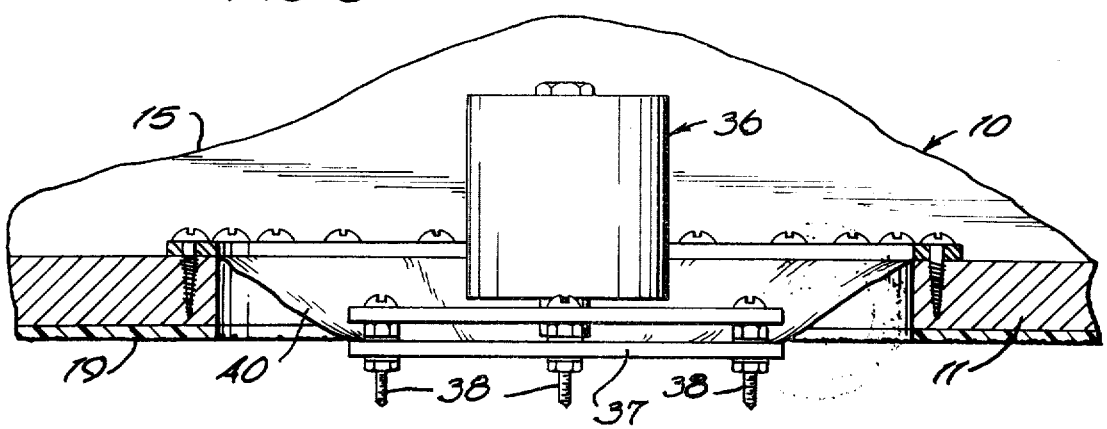
FIG. 5 is an enlarged fragmentary cross-sectional view taken along line 5—5 in FIG. 3.

The bottom wall 11 of container 10 has three apertures formed through it, one for an impact hammer and the remaining two for monitoring transducers. They are arranged along a straight longitudinal line through the center of wall 11. The first aperture, shown at 17, mounts the lower end of a vertical guide tube assembly (FIG. 4) denoted generally by the numeral 18. It slidably guides a cylindrical metal hammer 20 that slides within an inner cylindrical guide tube 21. The upper end of tube 21 terminates at a transverse partially closed upper end wall 22. Its lower end is completely open to permit hammer 20 to protrude through it for pavement contact. Tube 21 is resiliently mounted within a coaxial outer mounting tube 23 fixedly secured to container 10. A cylindrical cushion of resilient foam resin 24 fills the space between tubes 21 and 23.

Hammer 20 is manually activated by means of an upwardly protruding axial stem 25. The upper end of stem 25, which protrudes through wall 22 and top wall 12, is provided with an enlarged knob 27. Stem 25 is guided within container 10 by a cylindrical bushing 28 that surrounds the stem 25. Hammer 20 is freely slidable within tube 21. In use, it is manually raised to the height at which it engages wall 22, and is then released to fall by gravitational forces. In this manner a reproducible impact is achieved each time the hammer is utilized.

The first transducer unit 30 is located along wall 11 at a position as close as possible to the hammer 20. The transducer 30 is shown as a piezoelectric accelerometer. A useful example is a lead-zirconium-titanate crystal in an accelerometer configuration. This type transducer has a very high output voltage with excellent low frequency response characteristics. An outer weighted mass is positioned on the crystal supported on a triangular base 31. Three support screws 32 extend vertically downward from base 31 for surface contact with the pavement. A flexible diaphragm 33 surrounds base 31 and is mounted to the bottom wall 11 within the mounting aperture 35 by means of a mounting ring 34. The diaphragm 33 vibrationally isolates the transducer 30 from the remaining structure of container 10, and keeps transducer 30 centrally located within the open aperture 35.

A second transducer 36 is located on bottom wall 11 and spaced outward from the first transducer 30 to the side of transducer 30 opposite to the hammer 20. It is provided with a base 37, mounting screws 38, a diaphragm 40, all of which correspond to the items described with respect to transducer 30. Transducer 36 is mounted within a circular aperture 42 formed through bottom wall 11.

The Impulse Index is determined by providing an impulse of energy to the pavement when the hammer is manually actuated by dropping it through its guiding tube assembly 18. In a preferred form of the embodiment, the first transducer 30 is placed on the pavement as near to the hammer 20 as is reasonably practical. The second transducer 36 is placed at a distance 18 inches from the first transducer 30. The integral of the magnitude of signal from the first transducer 30 is referred to as $R_0$. The integral of the magnitude of signal from the second transducer 36 is referred to as $R_{18}$. The ratio of $R_0$ to $R_{18}$ provides a quantity which is a direct function of the attenuation of the energy as it propagates through the pavement. It has also been determined that poorer pavement yields higher values of $R_0$ than does better pavement. Therefore, the Impulse Index derived from this equipment has been formulated as:

$$\text{Impulse Index} = R_0 \times \frac{R_0}{R_{18}} = \frac{(R_0)^2}{R_{18}}$$

Referring to FIG. 6, the signals from transducers 30, 36 are directed to amplifier circuits 45, 46 respectively. The outputs of these circuits are fed through magnitude circuits 55, 56 and thence to a controlling gate circuit 47 to integrator circuits 48, 49. In the preferred embodiment, separate meters 52, 53 provide a visual indication of the integrated signals from the circuits 48, 49. Because of the nature of the index desired, a squaring circuit 50 is coupled to the output of integrator circuit 48. Its output, together with the output of integrator circuit 49 are directed to a divider circuit 51. The output from divider circuit 51 is fed to a third meter 54. Meters 52, 53 and 54 are preferably located along the top wall 12 of container 10. They are adjacent a manual control switch 56 that completes the circuits to the meters 52, 53 and 54 while depressed, and a rotatable selector switch 57 which defines the operative mode of the apparatus for test purposes, battery charge monitoring purposes, and battery charging purposes.

Referring to the physical layout shown in FIG. 2, the amplifier circuit 45 and integrator circuit 48 are mounted on a first circuit board 58, with circuits 46 and 49 on a second circuit board 59. A third circuit board 61 mounts the squaring circuit 50, and the divider circuit 51. A battery pack 60 is mounted on the upper surface of bottom wall 11.

A manual gain control switch 55 is located adjacent to the selector switch 57. It is a two position switch, with one position providing equal gain through both channels from the transducers and a second position which provides four times as much gain in the channel from transducer 36 as in the channel from transducer 30. This is used for testing pavement which yields a low value in the remote transducer channel. It requires that the meter reading at 53 be divided by four to normalize it. The impulse index reading will be one-fourth its normal value and must be multiplied by four to obtain its true value.

A switch 43 on the guide tube assembly 18 (FIG. 4) has an actuating lever 44 which is controlled by contact of hammer 20 when at its top most position. The switch 43 controls an enabling gate circuit 47 that serves as an internal timer to generate an electronic gate of prescribed duration. In the preferred embodiment discussed above, the electronic gate is 350 milliseconds wide. It is only for the duration of this gate that the two signal channels from the transducers are responsive. The gate significantly reduces the effect of noise and drift in the system. The choice of gate width is a compromise. The narrower the gate, the less effect drift and noise will have. It requires approximately 250 milliseconds for the plunger 20 to fall and produce the energy impulse. The signal from the transducers 30, 36 has a duration of about 40 milliseconds. If the gate were set only slightly greater than 290 milliseconds, the signal from the second bounce of the hammer 20 would sometimes be accepted, depending on the height of the bounce. The selected gate width of 350 milliseconds permits the signals of the bounce, if it exists, to pass. The gate very effectively eliminates problems of drift and noise from background equipment, such as passing vehicles. The meter readings obtained in operation hold their values and do not change even over a period of several minutes.

In operation, the unit is turned on with all circuits balanced by automatic or manual correction circuits. The container 10 is positioned on the pavement at the location desired. It is preferable that the operator place a knee on the container 10 to provide it with additional physical stability. The pad 19 prevents movement of container 10. With one hand the operator raises the knob 27 to its limit. While depressing switch 56 with the other hand, he releases knob 27, permitting plunger 20 to drop freely. The meters provide immediate visual readout of the results.

Various modifications can be made in the equipment to provide automatic recording of the meter readings, etc. These are believed to be within the skill of one trained in this field and are within the intended scope of the appended claims.

Having thus described my invention, I claim:

1. An apparatus for testing pavement structural condition, comprising;
   an enclosed container adpated to be hand-carried, said container including vertically spaced top and bottom walls bounded by enclosing upright walls, said bottom wall being adapted to rest upon the surface of the pavement portion being tested:
   a vertical guide tube assembly mounted within the container and extending along a vertical axis between said top and bottom walls, the bottom wall having an aperture formed therethrough across the lower end of the guide tube assembly;
   a vertical hammer slidably mounted within the guide tube for gravitational movement through said aperture along said axis from a raised position in the guide tube assembly, to impact the pavement surface;
   an upwardly extending stem fixed to said hammer and protruding through the top wall of the container to permit manual raising and release of the hammer;
   a first electrical accelerometer yieldably mounted on the bottom wall of the container for contact with the pavement surface at a location adjacent the aperture for said guide tube assembly;
   a second electrical accelerometer yieldably mounted on the bottom wall of the container for contact with the pavement surface at a location spaced from the location of said first electrical accelerometer to the side thereof opposite the aperture of said guide tube;
   hammer sensing means on said guide tube assembly for detecting the presence of said hammer at its raised position;
   and gated signal means operatively connected to said first and second electrical accelerometers and actuable in response to said hammer sensing means upon initial release of the hammer to monitor the electrical signals from said accelerometers during a preset time duration sufficient to assure impact of the pavement surface by said hammer.

2. An apparatus for testing pavement structural condition, comprising:
   a frame element having lower surfaces adapted to be supported at rest upon the pavement portions to be tested;
   impact means mounted on said frame element and adapted, when actuated, to mechanically deliver a predetermined energy impulse to the pavement at a first surface location with respect to a given position of the frame element;
   first electrical transducer means mounted by said frame element for surface contact with the pavement at a second surface location immediately adjacent said first surface location for producing an electrical signal related to the impulse energy received thereby through the pavement;
   second electrical transducer means mounted by said frame element for surface contact with the pavement at a third surface location displaced from said second surface location to the side thereof opposite said first location for producing an electrical signal related to the impulse energy received thereby through the pavement;
   electrical signal receiving means operatively connected to said first and second transducer means for monitoring the electrical signals produced thereby, including gate means rendered operative upon actuation of said impact means for limiting the monitoring of said electrical signals from said first and second transducer to a preset time duration adequate to assure transmission of impulse energy through the pavement to both transducers, but isolating background signals from other sources following such transmission;
   first and second signal integrating means connected to the electrical signal receiving means for integrating the magnitude of the electrical signals produced by the first and second electrical transducer means respectively, during the time duration preset by said gate means;
   impulse index computing means operatively connected to said first and second signal integrating means for receiving the integrated signals and computing a value indicative of pavement structural conditions by division of the square of the integrated signal from said first signal integrating means by the integrated signal from said second signal integrating means.

3. An apparatus for testing pavement structural condition, comprising:
   a frame element having lower surfaces adapted to be supported at rest upon the pavement portions to be tested;
   impact means mounted on said frame element and adapted, when actuated, to mechanically deliver a predetermined energy impulse to the pavement at a first surface location with respect to a given position of the frame element;
   first electrical transducer means mounted by said frame element for surface contact with the pavement at a second surface location immediately adjacent said first surface location for producing an electrical signal related to the impulse energy received thereby through the pavement;
   second electrical transducer means mounted by said frame element for surface contact with the pavement at a third surface location displaced from said second surface location to the side thereof opposite said first location for producing an electrical signal related to the impulse energy received thereby through the pavement;

electrical signal receiving means operatively connected to said first and second transducer means for monitoring the electrical signals produced thereby, including gate means rendered operative upon actuation of said impact means for limiting the monitoring of said electrical signals from said first and second transducer to a preset time duration adequate to assure transmission of impulse energy through the pavement to both transducers, but isolating background signals from other sources following such transmission;

a weighted hammer;

an upright guide on said supporting frame movably supporting said hammer for gravitational movement between a raised position and a lowered position in contact with the pavement surface;

and gate actuation means on said guide in the path of movement of said hammer and operatively connected to said gate means of initiating the monitoring of said electrical signals for said preset time duration in response to initial downward displacement of the hammer from its raised position.

4. An apparatus for testing pavement structural condition, comprising:

a container adapted to be hand-carried, said container including a bottom surface adapted to rest upon the surface of the pavement portion being tested;

a vertical guide tube assembly mounted on the container and extending along a vertical axis;

a vertical hammer slidably freely mounted within the guide tube for gravitational movement along said axis from a raised position in the guide tube assembly to a lowered position at which it impacts the pavement surface;

first electrical transducer means mounted on the container for contact with the pavement surface at a location adjacent said guide tube assembly;

second electrical transducer means mounted on the container for contact with the pavement surface at a location spaced from the location of said first electrical transducer means to the side thereof opposite the aperture for said guide tube;

hammer sensing means for detecting the presence of said hammer at its raised position;

and gated signal means operatively connected to said first and second electrical transducer means and actuable in response to said hammer sensing means upon initial release of the hammer to monitor the electrical signals from first and second electrical transducer means during a preset time duration sufficient to assure impact of the pavement surface by said hammer.

* * * * *